(12) United States Patent
Zhang et al.

(10) Patent No.: US 10,436,381 B2
(45) Date of Patent: Oct. 8, 2019

(54) WALL-HUNG BRACKET FOR PROJECTION SCREEN

(71) Applicant: QINGDAO HISENSE LASER DISPLAY CO., LTD., Shandong (CN)

(72) Inventors: Jianchun Zhang, Shandong (CN); Haitao Xu, Shandong (CN); Wensheng Lu, Shandong (CN); Zhiyong Hu, Shandong (CN); Shijie Wang, Shandong (CN); Yongzhong Xu, Shandong (CN); Changming Yang, Shandong (CN); Jianjun Li, Shandong (CN); Jinlong Huang, Shandong (CN)

(73) Assignee: QINGDAO HISENSE LASER DISPLAY CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/832,541

(22) Filed: Dec. 5, 2017

(65) Prior Publication Data

US 2019/0120422 A1    Apr. 25, 2019

(30) Foreign Application Priority Data

Oct. 23, 2017 (CN) .......................... 2017 1 0994871
Oct. 23, 2017 (CN) ..................... 2017 2 1368446 U
Oct. 23, 2017 (CN) ..................... 2017 2 1373033 U

(51) Int. Cl.
*F16M 11/04* (2006.01)
*F16M 13/02* (2006.01)
*G03B 21/58* (2014.01)

(52) U.S. Cl.
CPC .......... *F16M 13/02* (2013.01); *F16M 11/046* (2013.01); *G03B 21/58* (2013.01)

(58) Field of Classification Search
CPC ...... F16M 11/046; F16M 13/02; F16M 11/28; F16M 11/26; G03B 21/56; G03B 21/58; F16B 7/187; F16B 7/182; F16B 7/10
(Continued)

(56) References Cited

U.S. PATENT DOCUMENTS 2,408,205 A * 9/1946 Fancher .................. D05C 1/02
248/457
2,849,745 A * 9/1958 Madsen .................. A47L 4/04
134/135
(Continued)

FOREIGN PATENT DOCUMENTS

CN    2099210 U    3/1992
CN    2901501 Y    5/2007
(Continued)

OTHER PUBLICATIONS

Second Office Action issued in corresponding Chinese Patent Application No. 201710994871.3, dated May 21, 2019; with English translation.

*Primary Examiner* — Ingrid M Weinhold
(74) *Attorney, Agent, or Firm* — McDermott Will & Emery LLP

(57) ABSTRACT

A wall-hung bracket for a projection screen is provided, including a guide rail, a slider and a lead screw. The guide rail is configured for being fixed on a wall along a vertical direction. The slider is slidingly connected to the guide rail. The slider is configured for being connected to a rear surface of a projection screen. The lead screw is provided with threads, and the lead screw is in threaded connection to the slider. When the lead screw rotates on its longitudinal axis, the slider slides in the vertical direction along the guide rail driven by the lead screw.

19 Claims, 8 Drawing Sheets

(58) Field of Classification Search
USPC .......... 248/201, 295.11, 279.1, 285.1, 286.1,
248/287.1, 297.21, 161, 125.1–125.2,
248/125.8, 123.11, 405, 406.1, 300, 418,
248/257, 299.1; 403/109.6; 52/126.6;
359/443; 74/89.45
See application file for complete search history.

(56) References Cited

U.S. PATENT DOCUMENTS

| | | | | |
|---|---|---|---|---|
| 2,916,288 | A * | 12/1959 | Chervenka | A63B 63/083 248/274.1 |
| 4,395,040 | A * | 7/1983 | White | A63B 63/083 248/284.1 |
| 4,643,422 | A * | 2/1987 | Cramblett | A63B 63/083 248/641 |
| 4,941,661 | A * | 7/1990 | Lykens | A63B 63/083 254/98 |
| 4,948,127 | A * | 8/1990 | Willard | A63B 63/083 473/483 |
| 5,058,844 | A * | 10/1991 | Webb | B60R 11/06 248/286.1 |
| 5,279,496 | A * | 1/1994 | Schroeder | A63B 63/083 248/219.4 |
| 5,342,012 | A * | 8/1994 | Ryu | A47C 3/24 248/406.2 |
| 5,400,993 | A * | 3/1995 | Hamilton | F16M 11/10 248/279.1 |
| 5,800,296 | A * | 9/1998 | Shaw | A63B 63/083 473/483 |
| 5,947,849 | A * | 9/1999 | Ellenbaum | A63B 63/083 473/483 |
| 5,979,845 | A * | 11/1999 | Battey | A47B 9/10 248/161 |
| 5,984,567 | A * | 11/1999 | Gollin | A47C 7/004 248/161 |
| 6,056,654 | A | 5/2000 | Schroeder | |
| 6,279,860 | B1 * | 8/2001 | Swanger | B66F 3/16 248/125.2 |
| 6,368,240 | B1 * | 4/2002 | Pohrer | A63B 63/083 473/483 |
| 6,604,722 | B1 * | 8/2003 | Tan | F16M 11/10 248/276.1 |
| 6,708,940 | B2 * | 3/2004 | Ligertwood | F16M 11/10 248/279.1 |
| 6,871,454 | B2 * | 3/2005 | Coday, Sr. | E04G 11/38 52/126.6 |
| 7,044,423 | B2 * | 5/2006 | Bober | A47B 81/064 248/188.1 |
| 7,300,029 | B2 * | 11/2007 | Petrick | F16M 11/10 248/285.1 |
| 7,413,150 | B1 * | 8/2008 | Hsu | F16M 11/10 248/123.11 |
| 8,939,416 | B2 * | 1/2015 | Duranleau | E04F 21/1844 248/287.1 |
| 10,006,584 | B2 * | 6/2018 | Tremaine | E04F 21/185 |
| RE47,043 | E * | 9/2018 | Graham | F16M 11/18 |
| D829,534 | S * | 10/2018 | Kanter | D8/354 |
| 2005/0194499 | A1 * | 9/2005 | Drew | F16M 11/28 248/125.1 |
| 2006/0214072 | A1 | 9/2006 | Lee | |
| 2006/0261226 | A1 * | 11/2006 | Petrick | F16M 11/10 248/274.1 |
| 2007/0102600 | A1 | 5/2007 | Ishizaki et al. | |
| 2007/0221816 | A1 * | 9/2007 | Chun | F16M 11/046 248/674 |
| 2009/0308999 | A1 * | 12/2009 | Kim | F16M 11/048 248/299.1 |
| 2010/0012811 | A1 * | 1/2010 | MacKenzie | F16B 7/105 248/423 |
| 2010/0045943 | A1 * | 2/2010 | Gillespie | F16M 13/02 353/79 |
| 2012/0255919 | A1 * | 10/2012 | Jones | F16M 11/10 211/26 |
| 2013/0214102 | A1 * | 8/2013 | Huang | F16M 11/18 248/125.2 |
| 2013/0233984 | A1 * | 9/2013 | Huang | F16M 11/046 248/162.1 |
| 2013/0248670 | A1 * | 9/2013 | Saez | F16M 11/14 248/295.11 |
| 2014/0263890 | A1 | 9/2014 | McCarthy et al. | |
| 2016/0238191 | A1 * | 8/2016 | Tremaine | E04F 21/185 |

FOREIGN PATENT DOCUMENTS

| | | |
|---|---|---|
| CN | 101042943 A | 9/2007 |
| CN | 101526169 A | 9/2009 |
| CN | 202419087 U | 9/2012 |
| CN | 202925724 U | 5/2013 |
| CN | 103148330 A | 6/2013 |
| CN | 203051344 U | 7/2013 |
| CN | 103407917 A | 11/2013 |
| CN | 203535372 U | 4/2014 |
| CN | 203927339 U | 11/2014 |
| CN | 204358397 U | 5/2015 |
| CN | 204494032 U | 7/2015 |
| CN | 104918150 A | 9/2015 |
| CN | 204785439 U | 11/2015 |
| CN | 205118615 U | 3/2016 |
| CN | 106483753 A | 3/2017 |
| EP | 1 837 584 A2 | 9/2007 |
| FR | 2 716 630 A1 | 9/1995 |
| WO | 2012/008897 A1 | 1/2012 |

* cited by examiner (a)

(b)

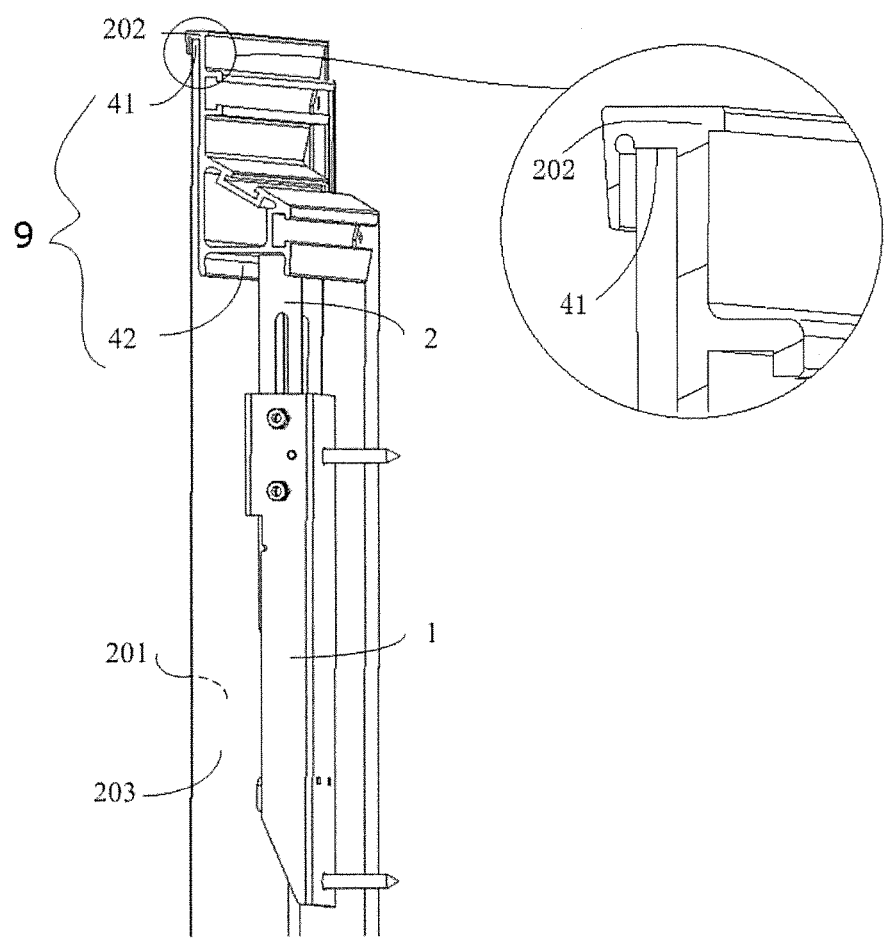

WALL-HUNG BRACKET FOR PROJECTION SCREEN

CROSS-REFERENCE TO RELATED APPLICATIONS

The present application claims the benefit and priority to Chinese Patent Application No. 201710994871.3 filed on Oct. 23, 2017 and entitled "WALL-HUNG BRACKET FOR PROJECTION SCREEN", Chinese Patent Application No. 201721373033.6 filed on Oct. 23, 2017 and entitled "ADJUSTMENT MECHANISM FOR PROJECTION SCREEN", and Chinese Patent Application No. 201721368446.5 filed on Oct. 23, 2017 and entitled "WALL-HUNG BRACKET FOR PROJECTION SCREEN", the disclosure of which is hereby incorporated by reference in its entirety.

TECHNICAL FIELD

The present disclosure relates to the technical field of projection equipment and in particular to a wall-hung bracket for a projection screen.

BACKGROUND

The projection equipment includes a projector and a projection screen. When the projection equipment is in use, a projection picture generated by the projector often incompletely corresponds to the projection screen.

In order to solve this problem, a common method in the related art is to adjust the height of the projection screen by changing the height of a wall-hung bracket for hanging the projection screen. Specifically, an adjustment hole is formed on the wall-hung bracket, and the adjustment hole may be connected to a wall at a predetermined position through a screw. In this way, by changing the cooperative connection of the adjustment hole and the screw, the height of the wall-hung bracket can be adjusted, and the height of the projection screen can be thus adjusted. However, this method for adjusting the height of the wall-hung bracket is step adjustment. Since the precision of the step adjustment is low, it is often unable to adjust the height of the projection screen to a position completely corresponding to the projection picture.

SUMMARY

The present disclosure provides a wall-hung bracket for a projection screen, including a guide rail, a slider and a lead screw. The guide rail is configured for being fixed on a wall along a vertical direction. The slider is slidingly connected to the guide rail, and configured for being connected to a rear surface of the projection screen. The lead screw is provided with threads, and the lead screw is in threaded connection to the slider. When the lead screw rotates on its longitudinal axis, the slider slides in the vertical direction along the guide rail driven by the lead screw.

BRIEF DESCRIPTION OF THE DRAWINGS

To describe the technical solutions in the embodiments of the present disclosure or in the related art more clearly, the accompanying drawings to be used in the descriptions of the embodiments or the related art will be briefly described below. Apparently, the accompanying drawings described hereinafter are only some of embodiments of the present disclosure, and a person of ordinary skill in the art can obtain other accompanying drawings according to these drawings without paying any creative effort.

FIG. 10 is another structure diagram of the connection between the wall-hung bracket for a projection screen and the projection screen according to some embodiments of the present disclosure.

DETAILED DESCRIPTION

The technical solutions in the embodiments of the present disclosure will be clearly and completely described below with reference to the accompanying drawings in the embodiments of the present disclosure. Apparently, the embodiments described herein are merely a part but not all of the embodiments of the present disclosure. All other embodiments obtained by a person of ordinary skill in the art without paying any creative effort on the basis of the embodiments in the present disclosure shall fall into the protection scope of the present disclosure.

It is to be noted that, the orientation or position relation indicated by terms "upper", "lower", "front", "rear", "left", "right", "vertical", "horizontal", "top", "bottom", "inside", or the like is an orientation or position relation shown based on the accompanying drawings, merely for describing the present disclosure and simplifying the description rather than indicating or implying that the specified device or element must have a particular orientation or be constructed and operated in a particular orientation. Therefore, the terms should not be interpreted as limitations to the present disclosure. Unless otherwise stated, in the description of the present disclosure, "a plurality of" means two or more.

It is to be noted that, unless otherwise expressly specified and defined, in the description of the present disclosure, the terms "mounting", "joint" and "connection" should be interpreted in a broad sense. For example, the connection may be fixed connection, detachable connection, integral connection or hanging connection; or, may be mechanical connection; or, may be direct connection or indirect connection by an intermediate member; or, may be internal communication between two elements. The vertical direction in the present disclosure does not only refer to the direction of gravity, and there also can be about 10% deviation. A person of ordinary skill in the art may understand the specific meanings of the terms in the present disclosure according to specific circumstances.

The present disclosure provides a wall-hung bracket for a projection screen in order to improve the precision of height adjustment of a projection screen.

Figure 1:
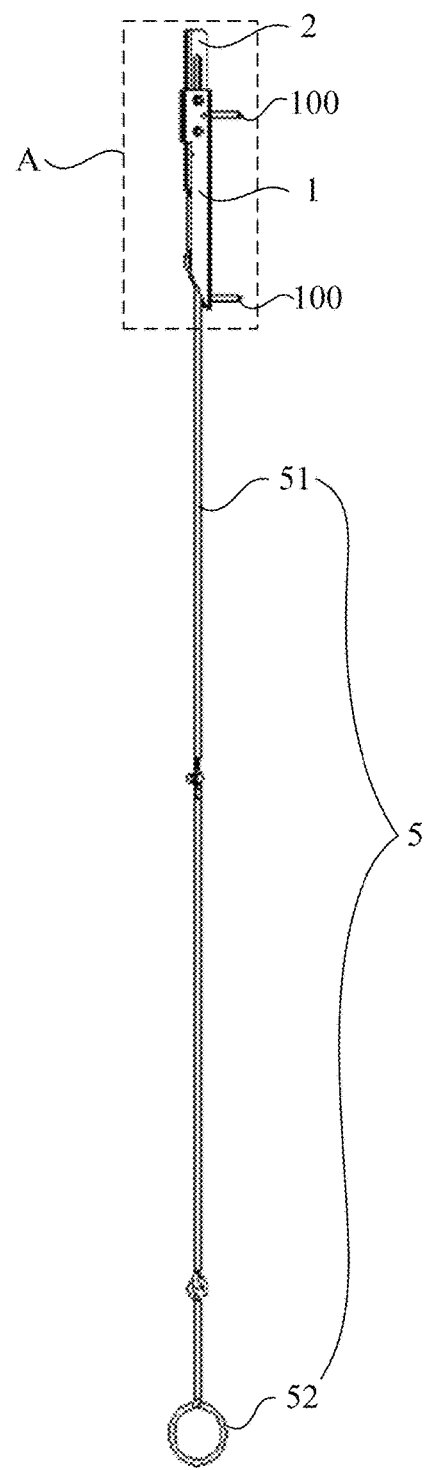
FIG. 1 is a side view of a wall-hung bracket for a projection screen according to some embodiments of the present disclosure.
Figure 2:
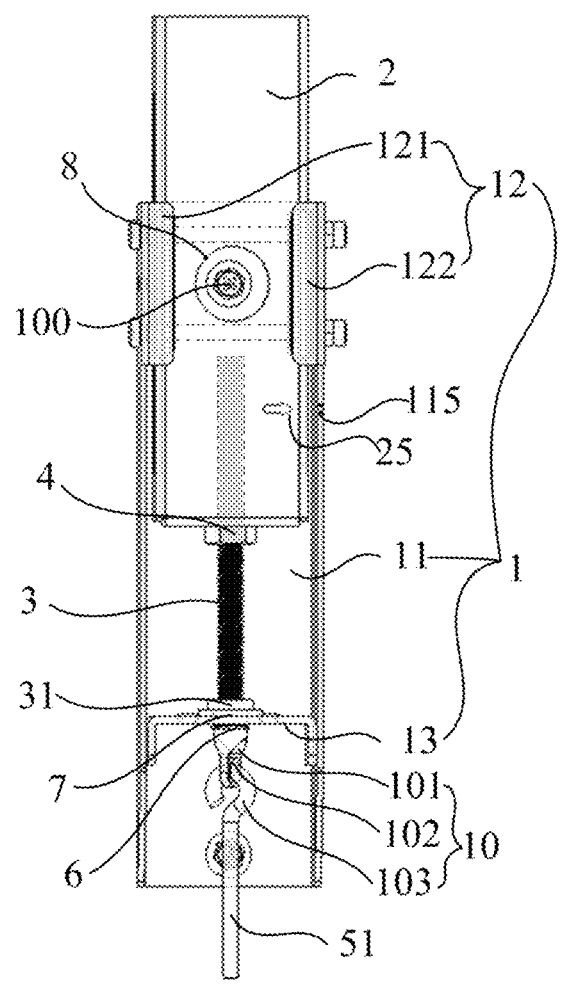
FIG. 2 is a front view of a region A in the wall-hung bracket for a projection screen in FIG. 1 (the structure indicated by the dashed line means that they cannot be directly viewed from the front)
Figure 3:
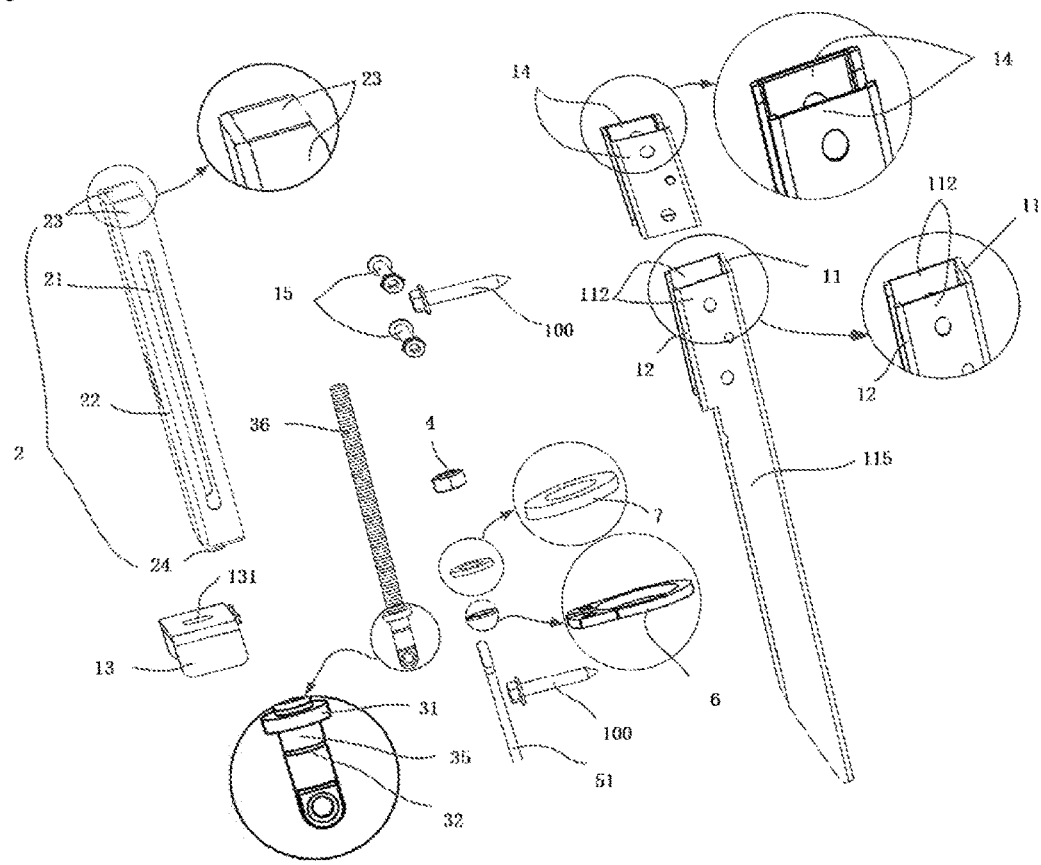
FIG. 3 is an exploded view of the region A in the wall-hung bracket for a projection screen in FIG. 1, in where (a) is a stereoscopic exploded view and (b) is a plane lateral exploded view.
Figure 3:
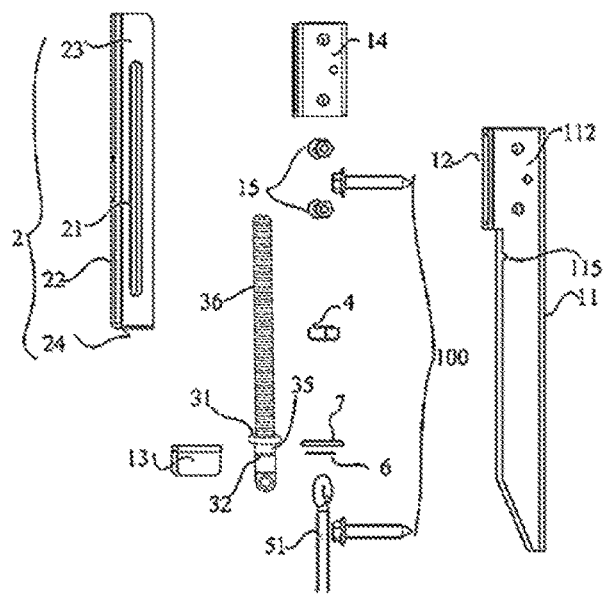

Referring to FIGS. 1, 2 and 3, the present disclosure provides a wall-hung bracket for a projection screen, including a guide rail 1, a slider 2 and a lead screw 3. The guide rail 1 is configured for being fixed on a wall along a vertical direction. The slider 2 is configured for being connected to a rear surface of a projection screen to hang the projection screen, and the slider 2 is slidingly connected to the guide rail 1. The lead screw 3 is provided with threads, and the lead screw 3 is in threaded connection to the slider 2. Hence, when the lead screw 3 rotates on its longitudinal axis, the slider 2 is driven to slide along the guide rail 1 which is fixed on the wall, i.e., slide in the vertical direction, so that the projection screen is driven to move in the vertical direction. Therefore, the height adjustment of the projection screen is realized. Compared with the related art, in the wall-hung bracket for a projection screen in the embodiments of the present disclosure, by the threaded connection of the lead screw 3 and the slider 2, the stepless adjustment of the projection screen in the vertical direction can be realized, so that the precision of height adjustment of the projection screen is improved and the height of the projection screen can be adjusted to a position completely corresponding to a projection picture. Meanwhile, based on the structural of the threaded connection between the lead screw 3 and the slider 2, self-locking of the slider 2 can be realized when the adjustment operation ends, so that the precision of height adjustment is ensured. In some embodiments, a part of the lead screw 3 may have a deviation from the longitudinal axis of the lead screw 3. As long as a part of the lead screw 3 which is connected to the slider 2, can rotate on its longitudinal axis, the lead screw 3 can drive the slider 2 to slide along the guide rail 1 in the vertical direction.

The guide rail 1, the slider 2 and the lead screw 3 form a lead screw adjustment mechanism shown by the region A in FIGS. 1, 2 and 3. The number of lead screw adjustment mechanisms in the wall-hung bracket for a projection screen may be determined according to the weight of the projection screen, the structure of the wall on where the wall-hung bracket and the projection screen are to be mounted and the specific structure of the lead screw adjustment mechanism. For example, for a 100-inch projection screen, a wall-hung bracket having two lead screw adjustment mechanisms may be selected, wherein the two lead screw adjustment mechanisms are arranged symmetrically and two sliders 2 together support the projection screen. However, for a light-weight projection screen, a wall-hung bracket having one lead screw adjustment mechanism which meets the requirement may be used.

In some embodiments, the wall-hung bracket for a projection screen provided by the present disclosure further includes a driving mechanism 5. The driving mechanism 5 is configured for driving the lead screw 3 to rotate on its longitudinal axis.

The driving mechanism 5 can drive the lead screw 3 to rotate clockwise and can also drive the lead screw 3 to rotate anticlockwise, so that the projection screen can be adjusted up and down and it is advantageous to accurately adjust the projection screen to a position completely corresponding to the projection picture.

In some embodiments, the guide rail 1 includes a mounting plate 11 and two rail side plates 112 that are perpendicular to the mounting plate 11 and parallel to each other. A surface of the mounting plate 11 away from the slider 2 is configured for being fitted and fixed onto the wall. The rail side plates 112 are arranged on a side of the mounting plate 11 facing the slider 2. The slider 2 includes a sliding face plate 22, two sliding side plates 23 that are parallel to each other and perpendicularly fixed to the sliding face plate 22, and a sliding bottom plate 24 that is perpendicular to the sliding face plate 22 and the two sliding side plates 23. The sliding side plates 23 are arranged on a side of the sliding face plate 22 facing the mounting plate 11, and the sliding bottom plate 24 is arranged at a lower end of the sliding face plate 22 and also on the side of the sliding face plate 22 facing the mounting plate 11. The sliding bottom plate 24 is configured for being in threaded connection to the lead screw 3. When the slider 2 is slidingly connected to the guide rail 1, the sliding face plate 22 of the slider 2 and the mounting plate 11 of the guide rail 1 are arranged in parallel and opposite to each other, and the two sliding side plates 23 are arranged in parallel between the two rail side plates 112.

The slider 2 may be in threaded connection to the lead screw 3 through a threaded hole formed on the sliding bottom plate 24, or may be in threaded connection to the lead screw 3 through a nut 4 fixed on a lower surface of the sliding bottom plate 24 as shown in FIG. 2 or FIG. 3. This will not be specifically limited herein. The fixation of the nut 4 and the slider 2 may be realized by welding, sticking or the like, and will not be specifically limited herein.

In addition, the nominal diameter, thread type and pitch of the lead screw 3 will not be limited herein, and can be designed comprehensively according to the size of the wall-hung bracket, the weight of the projection screen, and the height adjustment allowance and adjustment speed of the projection screen, specifically. In some embodiments, the nominal diameter of the lead screw 3 may be M1 to M16, for example, M8. The thread type may be left-hand coarse threads. The pitch may be 1.25 mm.

The guide rail 1 may be a guide rod extending in the vertical direction, or a guide chute extending in the vertical direction or other structures, and the structure of the guide rail 1 will not be specifically limited herein.

In some embodiments, as shown in FIG. 2, the guide rail 1 is a guide chute, and one or more positioning members 12 may be provided on the guide rail 1. The one or more positioning members 12 are located on at least one of the two rail side plates 112, for example, in an upper portion of at least one of the two rail guide plates 112. The one or more positioning member 12 extend relative to the at least one of the two rail side plates 112 in a horizontal direction parallel to the wall, so as to limit displacement of the slider 2 in a horizontal direction perpendicular to the wall. In this way, a side of the guide rail 1 away from the wall is not completely open, and when the slider is slidingly connected with the slide rail and can move in the vertical direction along the slide rail, displacement of the slider 2 in two movable directions of the horizontal direction is limited. That is, the displacement in the horizontal direction parallel to the wall is limited by the two rail side plates 112, and the displacement in the horizontal direction perpendicular to the wall is limited by the one or more positioning member 12 and the mounting plate 11. This structure is simple and easy to be implemented. In comparison to a design of the guide rail 1 being a closed slide rail having a closed horizontal section, the slider 2 can be inserted into the slide rail from the upper end or lower end of the slide rail, and can also be clipped into the slide rail from a side of the slide rail in some embodiments. Hence, another way is provided for mounting the slider 2. By limiting the slider 2 by the positioning member 12, the compactness of the assembled structure can be improved and the assembly precision can be ensured.

The one or more positioning member 12 may be of various structures. In some embodiments, as shown in FIG. 2, the one or more positioning member 12 includes a first positioning member 121 and a second positioning member 122 which are respectively arranged on the two rail side plates 112 and are parallel to the mounting plate 11. The first positioning member 121 and the second positioning member 122 are arranged at an interval and a side of the first positioning member 121 is opposite to a side of the second positioning member 122. The displacement of the slider 2 in the horizontal direction perpendicular to the wall is limited between a plane of the first positioning member 121 and the second positioning member 122, and the mounting plate 11. A gap between the first positioning member 121 and the second positioning member 122 allows a fixation member to pass therethrough so that it is not required to take down the positioning members, when the mounting plate 11 is to be connected to the wall.

The one or more positioning members 12 may be of an elastic structure or a rigid structure. A positioning member 12 and a rail side plate 112 may be connected in a non-detachable manner or in a detachable manner; or may be integrated molded. This will not be specifically limited herein.

In order to improve the wear resistance of the guide rail 1, in some embodiments, as shown in FIG. 3, a pad 14 is fixed on an inner wall of each rail side plate 112. The pad 14 is arranged between each rail side plate 112 and the slider 2. When the slider 2 slides up and down within a space formed by the one or more positioning members 12 and the mounting plate 11, the slider 2 comes into contact with the pad 14 frictionally. In this way, since the pad 14 on the guide rail 1 comes into contact with the slider 2 frictionally, due to high wear resistance of the pad 14, the wear resistance of the guide rail 1 can be improved and the service life of the guide rail 1 can be thus improved.

The pad 14 may be made of wear-resistant material. In some embodiments, the material of the pad 14 may be high-manganese steel, anti-wear high-chromium cast iron or the like, and will not be specifically limited herein.

In some embodiments, a pad 14 and a rail side plate 12 may be integrated molded or may be two detachably-connected independent structural members. This will not be specifically limited herein. In order to save the maintenance cost, in some embodiments, the pad 14 is detachably connected to the rail side plate 112. In this way, when the pad 14 is worn out, it is only required to maintain or replace this pad 14, and the maintenance or replacement of a whole guide rail 1 consisting of the pad 14, the one or more positioning members 12 and the mounting plate 11 is avoided, so that the maintenance cost is saved.

In some embodiments, the pad 14 may play the role of a positioning member 12, so that no positioning member will be provided separately. In this case, a portion of the pad 14 extends from the inner wall of the rail side plate 112, and the extended portion extends relative to the remaining portion of the rail side plate 112 in the horizontal direction parallel to the wall and is parallel to and opposite to the mounting plate 11.

In some embodiments, in order to prevent the slider 2 from falling off from the guide rail 1, as shown in FIGS. 2 and 3, a cross rod 15 may be further connected to the guide rail 1, and a sliding hole 21 is formed on each of the two sliding side plates 23. The sliding hole 21 is an elongated hole extending in the vertical direction, and a long side of the sliding hole 21 is parallel to a long side of this sliding side plate. The cross rod 15 passes through each sliding hole 21. Two ends of the cross rod 15 are connected to side walls of the guide rail 1, respectively. The side walls of the guide rail 1 include inner walls of the two rail side plates 112 or two pads 14. Arrangement of the cross rod 15 should give way to movement of the lead screw 3. For this purpose, the cross rod 15 may be arranged close to an end of the guide rail 1 away from the lead screw, or the vertical distance from any point in the cross rod 15 to the mounting plate is different from the vertical distance from any point in the lead screw 3 to the mounting plate, or the both conditions may be satisfied. When the slider 2 slides up and down along the guide rail 1, the sliding hole 21 can slide up and down relative to the cross rod 15. In this way, by the cooperation of the cross rod 15 with the sliding hole 21, the slider 2 may be prevented from falling off from the guide rail 1, so that the reliability of the sliding connection between the slider 2 and the guide rail 1 is ensured.

The cross rod 15 may be fixedly connected to the guide rail 1, or may be rotatably hinged to the guide rail 1 by using the cross rod itself as a spindle. This will not be specifically limited herein. In order to reduce the friction between the cross rod 15 and a inner wall of a sliding hole 21, in some embodiments, as shown in FIG. 2 or 3, by a through hole formed on each of the two rail side plates 112 or each pad 14, the cross rod 15 is rotatably hinged to the guide rail 1 by using the cross rod itself as a spindle. In this way, when the sliding hole 21 slides up and down relative to the cross rod 15, the friction between the cross rod 15 and the inner wall of the sliding hole 21 is rolling friction. Compared with sliding friction, the rolling friction generates a smaller friction force, so that it is advantageous to reduce the friction between the cross rod 15 and the inner wall of the sliding hole 21.

In some embodiments, the cross rod 15 may be of a stud structure, and cooperates with the nut to realize fixed connection. In this case, the two rail side plates 112 are connected to the two sliding side plates 23 respectively and the two sliding side plates 23 can move relative to the two rail side plates 112 but are not separated from the two rail side plates 112, so that the two sliding side plates 23 are prevented from falling off from the two rail side plates 112. The length of reciprocation of each of the two sliding side plates 23 is not greater than the length of the sliding hole 21, so the length of the sliding hole 21 needs to be selected according to the position requirement of the projection screen and the actual conditions of the wall-hung bracket. In order to enable the two sliding side plates 23 to move relative to the two rail side plates 112, the diameter of the cross rod 15 is less than the width of the sliding hole 21, and the length of the cross rod 15 is greater than the distance between outer sides of the two rail side plates 112.

In addition, there may be one or more cross rods 15, and this will not be specifically limited herein. In order to prevent the slider 2 from inclining toward the front side of the guide rail 1 due to the gravity of the projection screen, in some embodiments, as shown in FIG. 2 or 3, there are a plurality of cross rods 15, and the plurality of cross rods 15 are arranged at intervals in the vertical direction and all pass through each sliding hole 21. In this way, by cooperating the plurality of cross rods 15 with each sliding holes 21, the slider 2 may be prevented from inclining toward the front side of the guide rail 1 due to the capsizing moment of the projection screen, so that the effectiveness of the sliding connection between the slider 2 and the guide rail 1 is ensured.

The lead screw 3 includes a threaded portion 36 and a non-threaded portion 35. The lead screw 3 is connected to the guide rail 1. In order to realize the connection between the lead screw 3 and the guide rail 1, in some embodiments, as shown in FIG. 2, a support base 13 is fixed on the guide rail 1. As shown in FIG. 3, a mounting through hole 131 extending in the vertical direction is formed on the support base 13. The extension direction of the mounting through hole 131 is located within the extension direction of a slide rail formed by the mounting plate 11 and the two rail side plates 112. The non-threaded portion 35 of the lead screw 3 is connected to the support base 13 after passing through the mounting through hole 131, so that the lead screw 3 passes through the slide rail. The non-threaded portion 35 located through the mounting through hole 131 may freely rotate on its longitudinal axis. In order to allow the lead screw 3 to freely rotate on its longitudinal axis through the mounting through hole 131, the diameter of the mounting through hole 131 is greater than the diameter of the lead screw 3.

In some embodiments, a limiting structure for limiting the displacement of the lead screw 3 in the vertical direction is provided in the non-threaded portion 35 of the lead screw 3.

In some embodiments, the limiting structure may include a shaft shoulder 31 and an annular neck 32 which are arranged on the lead screw 3 at a position corresponding to the support base 13, and a snap ring 6, wherein both the shaft shoulder 31 and the annular neck 32 are arranged on a side wall of a lower portion of the lead screw 3. As shown in FIG. 2, the lead screw 3 is cooperatively penetrated through the mounting through hole 131, and located an upper side of the support base 13 via the shaft shoulder 31. The annular neck 32 extends from the lower side of the support base 13. By clamping the snap ring 6 onto the annular neck 32, the lead screw 3 may be prevented from moving up, and the shaft shoulder 31 can prevent the lead screw 3 from falling off from the support base 13, so that the movement of the lead screw 3 relative to the support base 13 in the vertical direction is limited.

In order to further prevent the lead screw 3 from falling off from the mounting through hole 131 due to the gravity of the projection screen, in some embodiments, as shown in FIG. 2 or 3, a gasket 7 is sheathed on the lead screw 3, and the gasket 7 is provided between a lower surface of the shaft shoulder 31 and an upper surface of the support base 13. In this way, the gasket 7 may further prevent the lead screw 3 from falling off from the mounting through hole 131, so that the stability and reliability of the connection between the lead screw 3 and the guide rail 1 are ensured.

In order to ensure the foregoing connection, in a longitudinal axis direction of the lead screw 3, the distance between the annular neck 32 and the shaft shoulder 31 is greater than or equal to the sum of the thickness of the gasket 7 and the thickness of the support base 13.

The gasket 7 may be fixed on the bottom of the shaft shoulder 31 in a riveting manner, and other forms meeting the requirements may also be used. This will not be specifically limited herein. In some embodiments, the gasket 7 is an elastic member which can buffer the relative acting force of the shaft shoulder 31 and the support base 13 and reduce the wear of the elements.

In some embodiments, a bearing may be provided within the mounting through hole 131. The bearing includes an outer ring, an inner ring, and balls provided between the outer ring and the inner ring. The outer ring of the bearing is arranged within an aperture of the mounting through hole 131. The lower end of the lead screw 3 passes through the inner ring of the bearing, the shaft shoulder 31 is abutted against above the inner ring, and underneath of the bearing may be limited by a snap ring or other components to prevent the lead screw 3 from shifting in the vertical direction. The design of using the bearing may reduce the friction between the lead screw and the support base, prolong the overall service life of the wall-hung bracket, and the noise in use is small.

In some embodiments, as shown in FIG. 2, the mounting plate 11 is connected to the wall through a fixation member 100. The fixation member 100 may be a screw, or may be a fastener or other structural members meeting the positioning requirement. There may be one fixation member 100, two fixation members 100 as shown in FIG. 2 or 3, or three or more fixation members 100. The number of the fixation member 100 may be selected according to the specific application environment of the wall-hung bracket and the actual conditions, and will not be specifically limited herein. In some embodiments, as shown in FIG. 2 or 3, there are two fixation members 100. In this case, the mounting plate 11 may be prevented from rotating relative to the wall, and fewer holes are formed on the mounting plate 11 so that the structural strength of the mounting plate 11 can be ensured. The two fixation members 100 may be arranged in the vertical direction or in the horizontal direction, and this will not be specifically limited herein.

Figure 7:
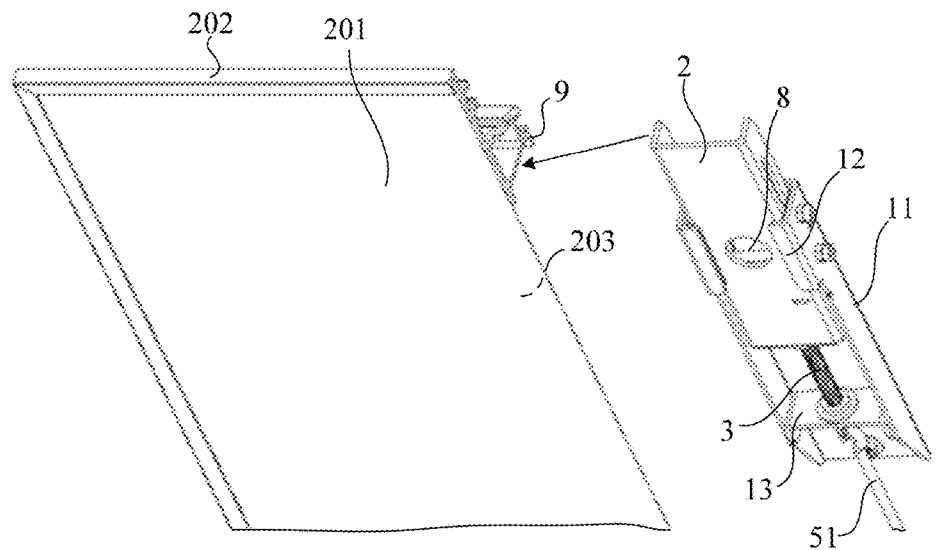
FIG. 7 is a schematic diagram of an assembly process of a hanging member and the remaining portion of the wall-hung bracket for a projection screen according to some embodiments of the present disclosure.

In order to conveniently connect the mounting plate 11 to the wall via the fixation member 100 and to realize the fixation operation without detaching the slider 2 from the guide rail 1, in some embodiments, as shown in FIGS. 2 and 7, an evading hole 8 is formed at a position on the slider 2 corresponding to a mounting hole on the mounting plate 11. Therefore, the slider 2 and the guide rail 1 may be assembled in advance. During mounting, the fixation member 100 may pass through the evading hole 8 to the mounting hole, and is then cooperated with the mounting hole to fix the mounting plate 11 on the wall. The evading hole 8 may be circular, triangular, square, pentagonal, hexagonal or the like, and this will not be specifically limited herein. In addition, when the evading hole 8 is circular, the diameter of the evading hole 8 will not be limited and may be specifically determined according to the size of the fixation hole and the size of the fixation member 100. For example, the diameter of the evading hole may be 8 mm to 35 mm, for example, 8 mm, 9 mm, 10 mm, 12 mm, 15 mm, 18 mm, 20 mm, 22 mm, 25 mm, 30 mm, 32 mm, 33 mm, 35 mm or the like. In some embodiments, the diameter of the evading hole 8 may be 20 mm.

In some embodiments, the fixation member 100 is a screw. Compared with the fastener connection, the connection by screws has higher connection strength, and it is advantageous to improve the strength and reliability of the connection between the projection screen and the wall.

The structure of the driving mechanism 5 will not be specifically limited herein. In some embodiments, the driving mechanism 5 may include a remote control motor. An output shaft of the remote control motor is coaxially connected to the lead screw. By controlling the remote control motor, the lead screw may be driven to rotate on its longitudinal axis.

Figure 4:
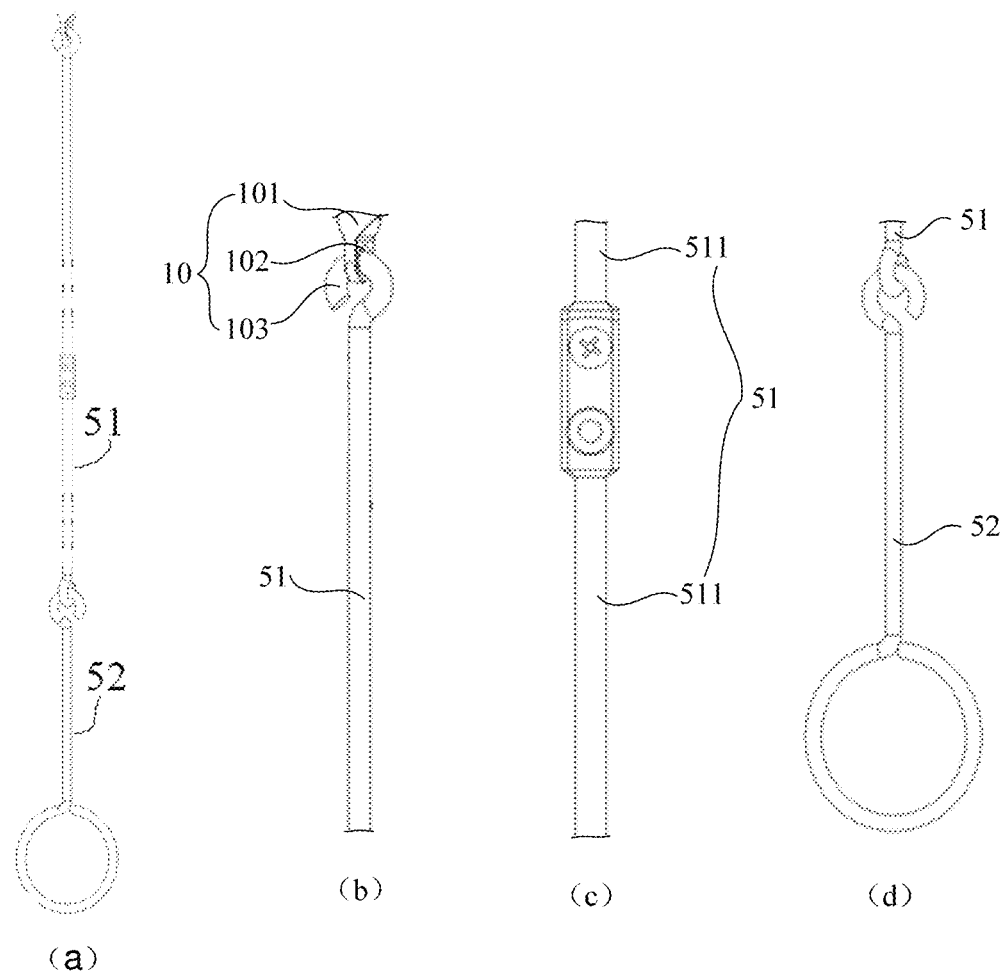
FIG. 4 is a structure diagram of a driving mechanism in the wall-hung bracket for a projection screen according to some embodiments of the present disclosure, where (a) is an overall structure diagram of the driving mechanism, (b) is a structure diagram of the connection between an upper end of a connecting rod in the driving mechanism and a lead screw, (c) is a structure diagram of the connection between two adjacent connecting rod segments of the connecting rod in the driving mechanism and (d) is a structure diagram of the connection between a lower end of the connecting rod and a handle in the driving mechanism.
Figure 5:
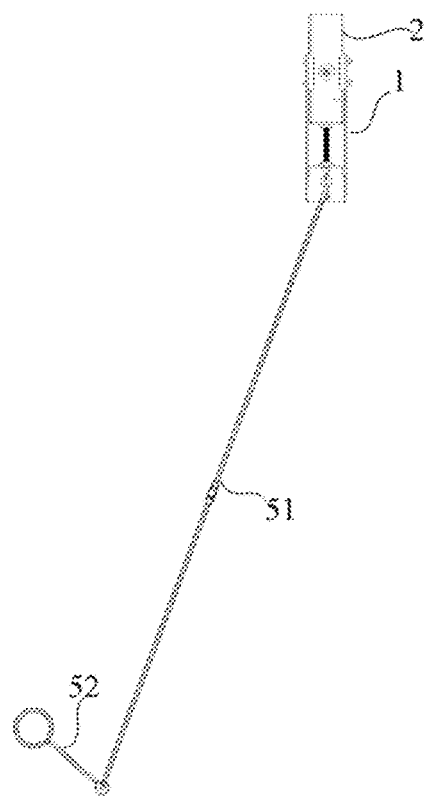
FIG. 5 is a structure diagram of the wall-hung bracket for a projection screen, when the driving mechanism therein is in a folded state, according to some embodiments of the present disclosure.

Or, in some embodiments, as shown in FIGS. 1 and 4, the driving mechanism 5 includes a connecting rod 51 and a handle 52. As shown in (a) and (b) of FIG. 4, a first end of the connecting rod 51 is connected to an end of the lead screw 3 away from the slider 2, while a second end thereof extends downward to the underneath of a lower edge of the projection screen. As shown in (d) of FIG. 4, the handle 52 is connected to the second end of the connecting rod 51. Moreover, torque can be transmitted between the connecting rod 51 and the lead screw 3 and between the handle 52 and the connecting rod 51. In this way, via holding the handle 52 by hand, the connecting rod 51 can be driven to rotate on its longitudinal axis so as to drive the lead screw 3 to rotate.

In the related art, the projection screen is generally large and heavy, and the projection screen needs to be taken down before adjusting the position of the wall-hung bracket and needs to be hung on the wall-hung bracket again after the adjustment of the wall-hung bracket. This process has high time consumption, large adjustment difficulty and high labor cost. With the structure of the driving mechanism 5 in the foregoing embodiments, the projection screen can be adjusted up and down without taking down the projection screen, so that the adjustment difficulty of the projection screen and the labor cost can be reduced.

In some embodiments, the driving mechanism 5 is of the foregoing structure includes a connecting rod 51 and a handle 52. The structure is simple, and neither power supply nor a motor is required, thus the cost is low.

In some embodiments, the diameter of the connecting rod 51 is 3 mm to 8 mm, for example, 3 mm, 4 mm, 5 mm, 6 mm, 7 mm, 8 mm or the like. When the diameter of the connecting rod 51 is within this range, the connecting rod 51 has a high structural strength, so it can remain its own structure and shape during the torque transmitting process, and the waste of material resulted from too large diameter of the connecting rod 51 is avoided at the same time. In some embodiments, the diameter of the connecting rod 51 may be 4 mm.

In some embodiments, as shown in (b) and (d) of FIG. 4, the first end of the connecting rod 51 and the lead screw 3 are connected with realizing relative rotation in a vertical plane, and the handle 52 and the second end of the connecting rod 51 are connected with realizing relative rotation in a vertical plane. In this way, after the projection screen has been adjusted, the connecting rod 51 may be folded in a direction towards the lead screw 3 in a vertical plane, and the handle 52 is folded in a direction towards the connecting rod 51 in a vertical plane and then fixed via a hook on the wall so that the driving mechanism 5 is hidden on a rear side of the projection screen, so that the appearance consistency of the projection screen is ensured. The hidden method may also be as follows: the connecting rod 51 and the handle 52 are folded and then hidden inside an extrudate grid of a border 202 in where the extrudate grid locates at a bottom of the projection screen; the handle 52 is connected to a hook built-in a bottom frame; or the handle 52 is removed.

In some embodiments, as shown in (b) of FIG. 4, the wall-hung bracket further includes a hanging structure 10 which is provided between the first end of the connecting rod 51 and the lead screw 3. The hanging device 10 includes a hanger 101, a hanging hole 102 and a hanging hook 103. The hanging hole 102 is formed on the hanger 101. The hanging hook 103 is provided to be hung into the hanging hole 102. Of the hanger 101 and the hanging hook 103, one is fixed to the lower end of the lead screw 3, while the other is fixed to the first end of the connecting rod 51. In this way, by the hanging device 10, the first end of the connecting rod 51 and the lead screw 3 are connected with realizing relative rotation in a vertical plane. In the hanging device 10, as shown in FIGS. 2, 3 and 4, the hanger 101 may be provided at the lower end of the lead screw 3, and the hanging hook 103 may be provided at the first end of the connecting rod 51; or, the hanging hook 103 may be provided at the lower end of the lead screw 3, and the hanger 101 may be provided at the first end of the connecting rod 51. In addition, the second end of the connecting rod 51 and the handle 52 may also be connected by a hanging device with realizing relative rotation in a vertical plane.

In some embodiments, the handle 52 is detachably connected to the second end of the connecting rod 51. In this way, after the projection screen has been adjusted, the handle 52 may be removed from the second end of the connecting rod 51, so that the size of the wall-hung bracket extending out from the lower edge of the projection screen is reduced and the appearance consistency of the projection screen is thus improved.

Since the connecting rod 51 extends downward from the lower end of the lead screw 3 to the underneath of the lower edge of the projection screen and the structure consisting of the guide rail 1, the slider 2 and the lead screw 3 is generally provided on the upper end of the rear surface of the projection screen, the connecting rod 51 is relatively long and it is disadvantageous for packaging and transportation. To solve this problem, in some embodiments, as shown in (c) of FIG. 4, the connecting rod 51 includes a plurality of connecting rod segments 511 arranged in the vertical direction. Two adjacent connecting rod segments 511 are detachably connected to each other, and torque can be transferred therebetween. In this way, during packaging and transportation, the connecting rod 51 may be disassembled into a plurality of connecting rod segments 511 to be packaged. Since the connecting rod segments 511 are relatively short, it is not difficult for packaging and transportation. After arrival at a user's home, the connecting rod segments 511 are successively connected again to form the connecting rod 51.

The two adjacent connecting rod segments 511 may be connected by a threaded connector, or may be snap-jointed by a fastener, or may be connected by other connecting structures. This will not be specifically limited herein. Compared with the connection using a fastener, the connection using a threaded connector is high in connection strength, good in stability, and advantageous for relative fixation during the rotation. Therefore, in some embodiments, as shown in (c) of FIG. 4, two adjacent connecting rod segments 511 are connected by a threaded connector. Specifically, the threaded connector may be a nut column, a screw or a bolt, and will not be specifically limited herein. Moreover, two adjacent connecting rod segments 511 may be connected by a threaded connector or by a plurality of threaded connectors, and this will not be specifically limited herein. In order to avoid loss of force caused by bending, loosening or the like of two adjacent connecting rod segments 511, in some embodiments, as shown in (c) of FIG. 4, a plurality of threaded holes are formed at ends of the two adjacent connecting rod segments 511, and the two adjacent connecting rod segments 511 are connected by a plurality of threaded connectors. Further, in some embodiments, two adjacent connecting rod segments 511 are connected by two threaded connectors, to avoid that the structural strength of the connecting rod segments 511 being greatly reduced due to the formation of too many holes on the connecting rod segments 511.

The structure of the handle 52 will not be specifically limited herein. In some embodiments, the handle 52 is a hand-held ring which may be circular, trapezoidal, square or in other structure. The circular, trapezoidal, square or other structure may be closed or non-closed as along as it can be held by a hand. This will not be limited herein. In some embodiments, as shown in (c) of FIG. 4, the handle 52 is a circular hand-held ring. Single-hand control may be realized by using the circular hand-held ring. Meanwhile, since the periphery of the hand-held ring is in smooth transition, during the operation, the hand-held ring will not generate a sense of pressure to the hand, so that the comfort in holding the handle 52 can be ensured.

The diameter of the circular hand-held ring will not be specifically limited herein. In some embodiments, the diameter of the circular hand-held ring may be 60 mm.

Figure 6:
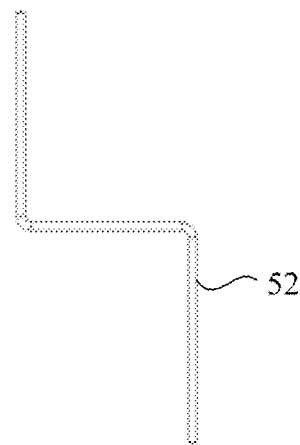
FIG. 6 is a structure diagram of a handle in the driving mechanism in the wall-hung bracket for a projection screen according to some embodiments of the present disclosure.

In some embodiments, the handle 52 is a crank-type handle shown in FIG. 6. This structure is simple and easy to operate. The crank-type handle may be in detachable connection (for example, threaded connection, key connection, sleeve connection or the like) to the second end of the connecting rod 51. In some embodiments, the crank-type handle may also be in non-detachable connection (for example, welding, riveting, sticking or the like) to the second end of the connecting rod 51. In this case, the crank-type handle may be in non-detachable connection to one of the connecting rod segments 511.

The effective length of threads on the lead screw 3 may be selected according to the overall size of the wall-hung bracket and a possible deviation between the actual projection screen and the projection picture, and will not be limited herein. On the premise that a possible deviation between the projection screen and the projection picture can be adjusted, to avoid the waste of material, the lead screw 3 can be not too long, so that the effective length of threads on the lead screw 3 can be not too long. The effective length of threads refers to the length of the lead screw capable of interacting with the slider when the slider moves up and down. In some embodiments, the effective length of threads on the lead screw 3 is 50 mm to 150 mm, for example, 50 mm, 60 mm, 70 mm, 80 mm, 90 mm, 95 mm, 100 mm, 105 mm, 110 mm, 120 mm, 140 mm, 150 mm or the like. In some embodiments, the effective length of threads on the lead screw 3 is 105 mm.

In some embodiments, the guide rail 1, the slider 2 and the support base 13 may be prepared from the same material, or two of them may be prepared from the same material, or they may be prepared from absolutely different material. And the material of the mounting plate 11, the slider 2 and the support base 13 can be selected according to the actual requirement of the wall-hung bracket.

In some embodiments, the guide rail 1 and the slider 2 may be aluminum profiles or sheet metal parts, and this will not be specifically limited herein. However, to save the production cost, in some embodiments, both the guide rail 1 and the slider 2 may be sheet metal parts. Compared with the aluminum profiles, the sheet metal parts have lower production cost, thus the production cost of the guide rail 1 and the slider 2 can be saved.

Figure 8:
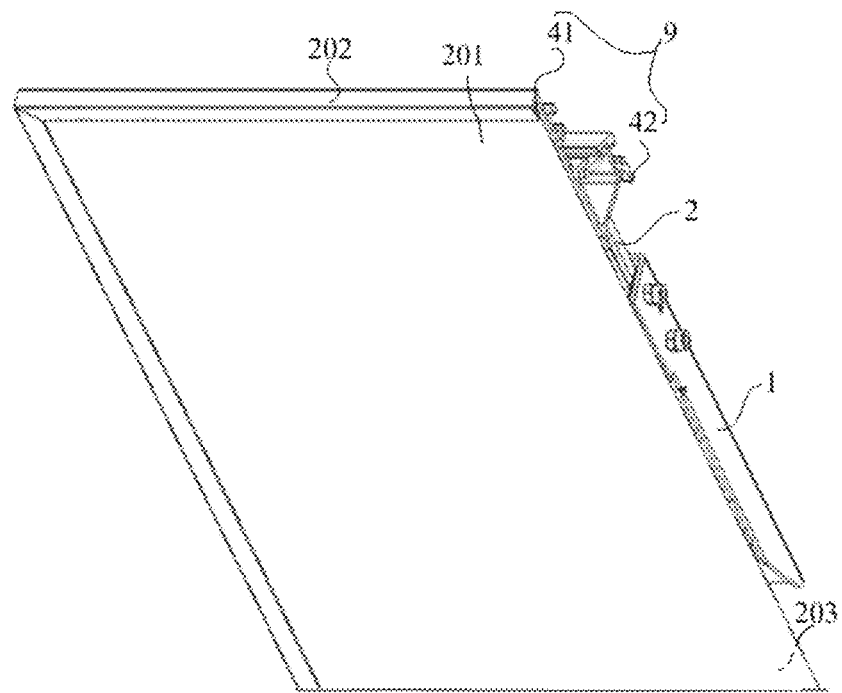
FIG. 8 is a structure diagram of the connection between the wall-hung bracket for a projection screen and a projection screen according to some embodiments of the present disclosure.
Figure 9:
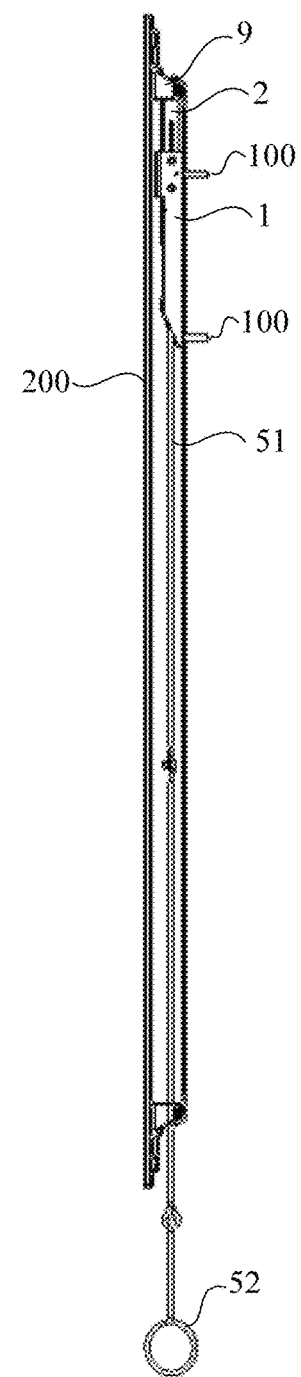
FIG. 9 is another structure diagram of the connection between the wall-hung bracket for a projection screen and the projection screen according to some embodiments of the present disclosure.

The slider 2 may be fixedly connected to the rear surface of the projection screen or may be connected to the rear surface of the projection screen by a hanging member. This will not be specifically limited herein. For the convenience of the connection of the projection screen on the wall, in some embodiments as shown in FIG. 7, the wall-hung bracket further includes a hanging member 9 which is configured for being fixed to the rear surface of the projection screen 200 and hung onto the slider 2 (as shown in FIGS. 8, 9 and 10). In this way, the projection screen 200 is fixed onto the wall in a hanging manner, and it is convenient for the connection of the projection screen 200 on the wall.

The specific structure of the hanging member 9 will not be limited herein. In some embodiments, as shown in FIG. 7, the hanging member 9 is a horizontal chute parallel to the rear surface of the projection screen 200. The horizontal chute has a downward opening and may be buckled at the upper end of the slider 2. After the top end of the slider 2 extends into the opening of the horizontal chute, due to the position-limiting effect of the chute, the horizontal chute is able to reciprocate relative to the slider 2 in a horizontal direction parallel to the wall. In this way, the adjustment of the projection screen in a left-right direction can be realized by pushing the projection screen in a horizontal direction parallel to the wall. This structure is simple and easy to be implemented.

As shown in FIG. 7, the projection screen 200 generally includes a screen body 201, a border 202 which enclose edges of the screen body 201, and a back plate 203. In order to improve the strength of connection between the hanging member 9 and the rear surface of the projection screen, in some embodiments, as shown in FIG. 7, FIG. 8 or FIG. 10, the hanging member 9 is fixed to the border 202 of the projection screen. In this way, by fixing the hanging member 9 on the high-strength border 202, it is advantageous to improve the strength of connection between the hanging member 9 and the projection screen 200. In some embodiments, the hanging member 9 is fixed on the back plate 203 of the projection screen, and the hanging member 9 and the back plate 203 may be arranged separately or integrated molded.

In some embodiments, as shown in FIG. 8 and FIG. 10, the hanging member 9 includes a neck 41 and a groove 42, an upper edge of the projection screen is clamped within the neck 41, and the groove 42 can be slidingly hung onto the slider 2 in a horizontal direction parallel to the wall.

In this embodiment, by clamping the upper edge of the projection screen within the neck 41 and buckling upside-down the groove 42 onto the slider 2 of the lead screw adjustment mechanism which has been fixed on the wall, the wall-hung bracket and the projection screen are mounted and fixed. The process of mounting and fixation is simple. When the projection screen needs to be adjusted leftwards or rightwards, an operator pulls the projection screen leftwards or rightward, thus the groove 42 moves leftwards or rightwards on the slider 2 to directly adjust the position of the projection screen in the left-right direction, so that continuous stepless adjustment of the projection screen in the left-right direction can be realized. With a simple structure, a high adjustment precision and a convenient and quick adjustment process, this wall-hung bracket can be mounted and adjusted autonomously by a user.

In some embodiments, in order to decrease the difficult in assembling the wall-hung bracket and the projection screen 200, the hanging member 9 and the border 202 are integrated molded, or the hanging member 9 and a part of the border 202, i.e., an upper border, are integrated molded. In this way, the operation of connecting the hanging member 9 and the border 202 is omitted, and the difficulty in assembling the wall-hung bracket and the projection screen is thus decreased.

The process of integrated molding the hanging member 9 and at least one part of the border 202, or the process of integrated molding the handing member 9 and the back plate 203 may be an extrusion molding process, a sheet metal process or a casting process, and will not be specifically limited herein. Moreover, the integral structure may be made of aluminum, carbon steel or other material, and this will not be specifically limited herein.

In some embodiments, in order to conveniently mount and fix the projection screen onto the wall-hung bracket, as shown in FIGS. 2 and 3, an arrow 25 for identifying an initial mounting position is provided on a surface of the sliding face plate 22 away from the mounting plate 11, and a notch 115 which is configured for aliging at the arrow is formed on one of the two rail side plates 112.

After the lead screw adjustment mechanism consisting of the guide rail 1, the slider 2 and the lead screw 3 is fixed on the wall, the initial mounting position of the projection screen to be mounted onto the wall-hung bracket is determined by aligning the arrow 25 on the sliding face plate 22 with the notch 115 on the one of the two rail side plates 112. In this case, the lead screw 3 is located at a position where the lead screw can move up or down optimally, i.e., the lead screw 3 being connected to the slider 2 at a middle position of the effective length of threads, so that the projection screen can be conveniently adjusted up and down.

In the descriptions of the specification, specific features, structures, materials or characteristics can be combined appropriately in any one or more embodiments or examples.

The foregoing descriptions merely show specific implementations of the present disclosure, and the protection scope of the present disclosure is not limited thereto. Any person of skill in the art can readily conceive of variations or replacements within the technical scope disclosed by the embodiments of the present disclosure, and these variations or replacements shall fall into the protection scope of the present disclosure. Accordingly, the protection scope of the present disclosure shall be subject to the protection scope of the claims.

What is claimed is:

1. A wall-hung bracket for a projection screen, comprising:
    a guide rail configured to be mounted on a wall along a vertical direction;
    a slider slidably connected to the guide rail, and configured to be connected to a rear surface of the projection screen; and
    a lead screw provided with threads, and the lead screw is in threaded connection to the slider, and, in response to the lead screw rotating on a longitudinal axis of the lead screw, the slider slides in the vertical direction along the guide rail driven by the lead screw;
    the guide rail comprises a mounting plate and two rail side plates that are perpendicular to the mounting plate and parallel to each other, and a surface of the mounting plate away from the slider is configured to be mounted onto the wall; and
    the slider comprises a sliding face plate, two sliding side plates that are perpendicular to the sliding face plate and parallel to each other, and a sliding bottom plate that is perpendicular to the sliding face plate and the two sliding side plates, wherein the sliding bottom plate is arranged at a lower end of the sliding face plate and is in threaded connection with the lead screw,
    wherein, each of the two sliding side plates is provided with a sliding hole extending in the vertical direction, and the wall-hung bracket further comprises a cross rod, one end of the cross rod passes through the sliding hole in one of the sliding side plates and is fixed to one of the rail side plates, and another end of the cross rod passes through the sliding hole in another one of the sliding side plates and is fixed to another one of the rail side plates.

2. The wall-hung bracket for a projection screen according to claim 1, wherein the wall-hung bracket further comprises a driving mechanism which is arranged at an end of the lead screw and configured to drive the lead screw to rotate on the longitudinal axis of the lead screw.

3. The wall-hung bracket for a projection screen according to claim 2, wherein the driving mechanism comprises a connecting rod and a handle, wherein a first end of the connecting rod is connected to an end of the lead screw, while a second end of the connecting rod is connected to the handle, and torque is able to be transmitted between the connecting rod and the lead screw and between the handle and the connecting rod.

4. The wall-hung bracket for a projection screen according to claim 3, wherein the handle and the second end of the connecting rod are detachably connected.

5. The wall-hung bracket for a projection screen according to claim 3, wherein the connecting rod comprises a plurality of connecting rod segments, and two adjacent connecting rod segments among the plurality of connecting rod segments are detachably connected and torque is able to be transmitted therebetween.

6. The wall-hung bracket for a projection screen according to claim 3, wherein the lead screw is driven to rotate on the longitudinal axis of the lead screw by the connecting rod; and the connecting rod is driven to rotate on a longitudinal axis of the connecting rod by the handle.

7. The wall-hung bracket for a projection screen according to claim 1, wherein one or more positioning members are provided on the guide rail, and the one or more positioning members are arranged on at least one of the two rail side plates and extend relative to the at least one of the two rail side plates in a horizontal direction parallel to the mounting plate.

8. The wall-hung bracket for a projection screen according to claim 7, wherein the one or more positioning members comprise a first positioning member and a second positioning member which are respectively arranged on the two rail side plates, and the first positioning member and the second positioning member are spaced apart from each other and a side of the first positioning member is opposite to a side of the second positioning member.

9. The wall-hung bracket for a projection screen according to claim 1, wherein a pad is provided on an inner wall of each of the two rail side plates.

10. The wall-hung bracket for a projection screen according to claim 9, wherein each pad is detachably connected to a corresponding one of the two rail side plates.

11. The wall-hung bracket for a projection screen according to claim 1, wherein a support base is fixedly provided on the guide rail, and a mounting through hole is formed on the support base;
    a shaft shoulder and an annular neck are provided on a side wall of a lower portion of the lead screw;

the wall-hung bracket further comprises a snap ring; and when the lead screw passes through the mounting through hole, the shaft shoulder is located on an upper side of the support base, the annular neck extends from a lower side of the support base, and the snap ring is clamped onto the annular neck to limit the movement of the lead screw relative to the support base in the vertical direction.

12. The wall-hung bracket for a projection screen according to claim 11, further comprising a gasket which is provided between the shaft shoulder and the support base.

13. The wall-hung bracket for a projection screen according to claim 1, further comprising a hanging member which is hung onto the slider and is configured to connect the slider to the rear surface of the projection screen.

14. The wall-hung bracket for a projection screen according to claim 13, wherein the hanging member is a horizontal chute parallel to the mounting plate, and the horizontal chute has a downward opening and is configured to receive the slider.

15. The wall-hung bracket for a projection screen according to claim 14, wherein the hanging member is configured to be mounted with a back plate of the projection screen.

16. A wall-hung bracket for a projection screen, comprising:
a guide rail configured to be mounted on a wall along a vertical direction;
a slider, slidably connected to the guide rail, and configured to be connected to a rear surface of the projection screen; and
a lead screw provided with threads, and the lead screw is in threaded connection to the slider, and, when the lead screw rotates on a longitudinal axis of the lead screw, the slider slides in the vertical direction along the guide rail driven by the lead screw; and
wherein the slider is provided with two opposite sliding holes extending in the vertical direction, and the guide rail further comprises a cross rod, each end of the cross rod passes through the two opposite sliding holes, respectively, so that the sliding holes slide relative to the cross rod in the vertical direction,
the guide rail comprises a mounting plate and two rail side plates that are perpendicular to the mounting plate and parallel to each other, and a surface of the mounting plate away from the slider is configured to be mounted onto the wall;
the slider comprises a sliding face plate, two sliding side plates that are perpendicular to the sliding face plate and parallel to each other, and a sliding bottom plate that is perpendicular to the sliding face plate and the two sliding side plates, wherein the sliding bottom plate is arranged at a lower end of the sliding face plate and is in threaded connection with the lead screw, and
a support base is fixedly provided on the guide rail and the support base is located between the two rail side plates, a mounting through hole is formed on the support base.

17. The wall-hung bracket for a projection screen according to claim 16, wherein
a first positioning member is arranged on one of the two rail side plates and extends relative to the one of the two rail side plates in a horizontal direction parallel to the mounting plate, and a second positioning member is arranged on another of the two rail side plates and extends relative to the another of the two rail side plates in a horizontal direction parallel to the mounting plate, the positioning members extend inwardly from the rail side plates, and form a receiving space with the mounting plate of the guide rail and the rail side plates to receive the slider.

18. The wall-hung bracket for a projection screen according to claim 17,
wherein the first positioning member and the second positioning member are spaced apart from each other and a side of the first positioning member is opposite to a side of the second positioning member.

19. The wall-hung bracket for a projection screen according to claim 16, wherein
a shaft shoulder and an annular neck are provided on a side wall of a lower portion of the lead screw;
the wall-hung bracket further comprises a snap ring; and
when the lead screw passes through the mounting through hole, the shaft shoulder is located on an upper side of the support base, the annular neck extends from a lower side of the support base, and the snap ring is clamped onto the annular neck to limit the movement of the lead screw relative to the support base in the vertical direction.

* * * * *